United States Patent [19]

Shutt et al.

[11] Patent Number: 4,531,429
[45] Date of Patent: Jul. 30, 1985

[54] MARINE TRANSMISSION

[75] Inventors: Donald P. Shutt, Long Beach; Thurman W. Jessup, Lynwood, both of Calif.

[73] Assignee: Westech Gear Corporation, Lynwood, Calif.

[21] Appl. No.: 505,923

[22] Filed: Jun. 20, 1983

[51] Int. Cl.³ .................... F16H 3/44; F16H 57/10
[52] U.S. Cl. .................................. 74/792; 74/789
[58] Field of Search .......................... 74/789, 792

[56] References Cited

U.S. PATENT DOCUMENTS

| 846,182 | 3/1907 | Boughton | 74/773 |
|---|---|---|---|
| 1,078,565 | 11/1913 | Tuttle | 74/792 |
| 1,246,503 | 11/1917 | Tuttle | 74/792 |
| 1,264,561 | 4/1918 | Riker | 74/792 |
| 1,291,560 | 1/1919 | Larkin | 74/792 |
| 1,379,498 | 5/1921 | Wiberg | 74/792 |
| 1,896,440 | 2/1933 | Durig | 74/792 |
| 2,223,413 | 12/1940 | Gasser | 74/298 |
| 2,414,832 | 1/1947 | Orr | 74/298 |
| 2,456,614 | 12/1948 | Banker | 74/297 |
| 2,504,781 | 4/1950 | Alben | 74/780 |
| 2,668,460 | 2/1954 | Butterfield | 74/780 |
| 2,690,086 | 9/1954 | Cook | 74/740 |
| 2,757,558 | 8/1956 | Stoeckicht | 74/792 |
| 2,959,987 | 11/1960 | Miller | 74/792 |
| 3,008,341 | 11/1961 | Cobb | 74/472 |
| 3,461,743 | 8/1969 | Henry-Biabaud | 74/674 |
| 3,478,622 | 11/1969 | Reid | 74/792 |
| 3,563,114 | 2/1971 | Casale | 74/792 |
| 3,685,371 | 8/1972 | Crooks | 74/792 |
| 4,150,590 | 4/1979 | Hurst | 74/780 |
| 4,242,925 | 1/1981 | Farkas | 74/792 |

FOREIGN PATENT DOCUMENTS

| 0001348 | 4/1979 | European Pat. Off. | 74/789 |
|---|---|---|---|
| 0007235 | 12/1979 | European Pat. Off. | |
| 348366 | 5/1937 | Italy | 74/792 |
| 989161 | 4/1964 | United Kingdom | |
| 2001020 | 7/1978 | United Kingdom | |

Primary Examiner—George H. Krizmanich
Assistant Examiner—Dirk Wright
Attorney, Agent, or Firm—Pretty Schroeder Brueggemann & Clark

[57] ABSTRACT

A marine transmission is capable of operating in three modes, normal ahead, maneuver ahead and reverse. It includes a positive engagement clutch for the normal ahead mode and modulated engagement mechanism (a clutch and a brake) for the maneuver ahead and reverse modes. Power is supplied to an output shaft through an external shaft. The maneuver ahead and reverse modes use an internal shaft concentric with the external shaft. In the reverse mode the direction of the external shaft is changed by employing a planetary gear arrangement.

20 Claims, 6 Drawing Figures

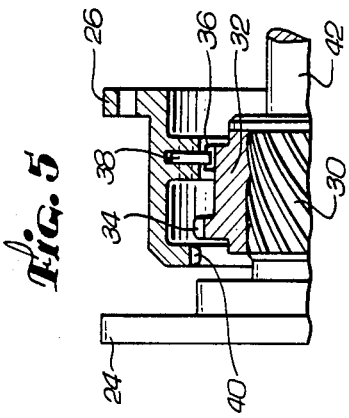
Fig. 5
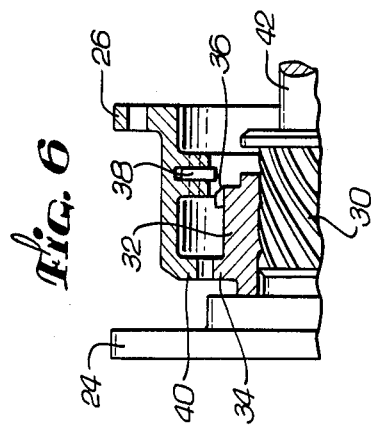
Fig. 6
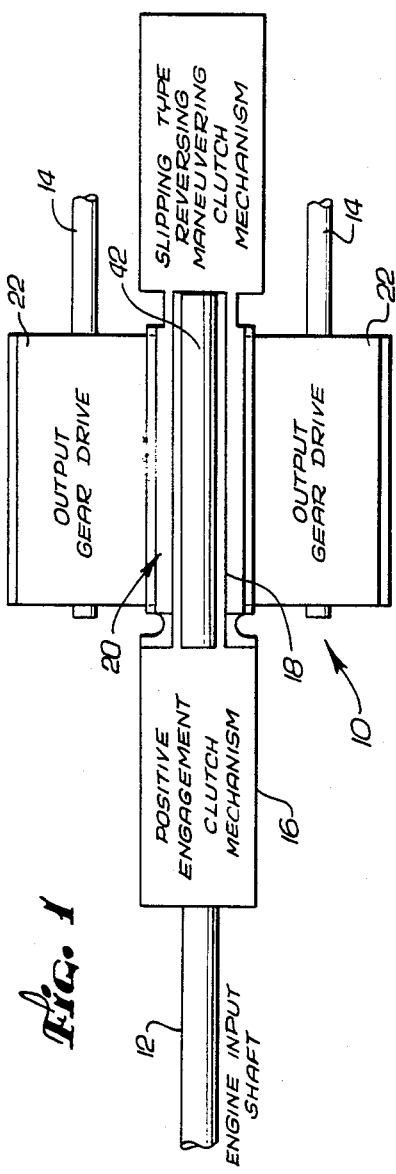
Fig. 1
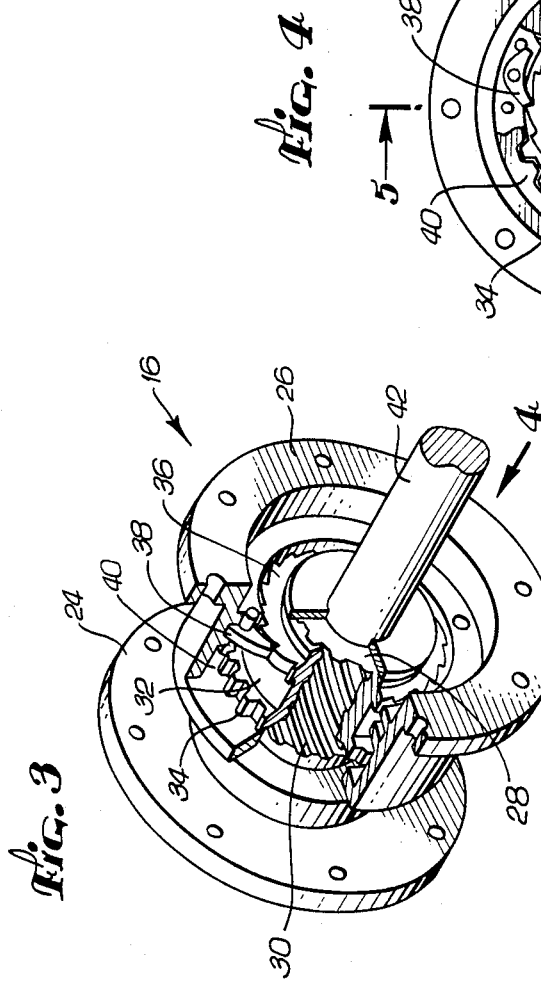
Fig. 4
Fig. 3

MARINE TRANSMISSION

FIELD OF THE INVENTION

The present invention relates to transmissions and, more particularly, to marine transmissions capable of operating in forward and reverse modes.

BACKGROUND OF THE INVENTION

Some of the large marine transmissions that are presently in use have forward and reverse modes of operation, which is necessary because the gas turbine engines in use today are unidirectional power sources. In the past, steam engines, which were bi-directional, were more common.

Reversible marine transmissions generally include clutches in which interleaved plates are engaged under pressure. Prompt disengagement of the power source and modulation of the output speed are facilitated in this manner, these features being important when a ship is maneuvering. Most of the time, however, the transmission operates continuously in the ahead mode without employing these capabilities.

Modulated engagement clutches are sometimes problematic and are subject to being burned out, often when the ship is far from a suitable repair facility. When a clutch fails, a common practice is to effect a temporary repair by rigidly joining the input and output shafts of the clutch together, using an arrangement known as "get home bolts". This arrangement, however, presents the serious drawback that it precludes the availability of reverse. It also makes maneuvering difficult because of the absense of a disengaging clutch in the power train.

An objective of the present invention is to provide an improved marine transmission that employs modulated engagement clutches or brakes for maneuvering and reverse operations but avoids the consequences traditionally associated with the use of a modulated engagement clutch to transmit power during long periods of operation when the capabilities of such devices are not required. Another objective is to provide a marine transmission with redundancy in the forward mode of operation to improve its reliability. Still another advantage is to provide a marine transmission of relatively simple and reliable construction.

SUMMARY OF THE INVENTION

The present invention resides in a marine transmission that accomplishes the above objectives. It is capable of operating in three distinct modes, normal ahead, maneuver ahead, and reverse. A positive engagement clutch can rigidly connect an input shaft to an output shaft, thereby causing the transmission to operate in the normal ahead mode. In the manuever ahead mode, a first modulated engagements means connects these shafts.

In the reverse mode, a second modulated engagement means, preferably a brake, operatively connects the input and output shafts. Direction reversing means, associated with one of the modulated means, causes the input and output shafts to rotate in opposite directions.

According to a more detailed aspect of the invention, the transmission includes an external shaft and an internal shaft. The output shaft is coupled to the external shaft. The positive engagement clutch rigidly connects the external shaft to the input shaft to rotate with the input shaft, thereby causing the transmission to operate in the normal ahead mode. A synchro-self-shifting clutch is the preferred form of positive engagement clutch.

The first modulated engagement means can connect the external shaft to the input shaft through the internal shaft to rotate with the input shaft. The second modulated engagement means can connect the output shaft to the input shaft. The second modulated engagement means can connect the output shaft to the input shaft through the internal shaft to rotate against the input shaft. The direction reversing means can be a gear train, the gears being arranged between the external and internal shafts.

According to another aspect of the invention, the positive engagement clutch is at one end of the internal shaft while the modulated engagement means are at the other end. The transmission also includes a non-rotatable housing surrounding the modulated engagement means.

Preferably the gear arrangement is of the planetary type, a plurality of planet gears being mounted on a carrier and engaged by a sun gear connected to the internal shaft. The ring gear can be attached to a bell, that is secured to a bell-like member, that is in turn secured to the external shaft for rotation therewith. The planet carrier can be connected to the housing by engagement of the second modulated engagements means, e.g., a brake, to prevent rotation of the carrier.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a schematic diagram of a transmission constructed in accordance with the present invention;

FIG. 3 is a partially broken away three dimensional illustration of the positive engagement clutch of the transmission with a clutch pawl in an engaged position;

FIG. 4 is an end view of the top half of the clutch of FIG. 3 taken as indicated by the arrow 4 of FIG. 3, also showing the pawl in its engaged position;

FIG. 5 is a cross-sectional view of the top half of the clutch taken along the line 5—5 of FIG. 4 and showing the pawl in its engaged position; and FIG. 6 is a cross-sectional view similar to FIG. 5 but showing the pawl in its disengaged position and showing clutch teeth in an engaged position to transmit power.

DESCRIPTION OF THE PREFERRED EMBODIMENT

Figure 2:
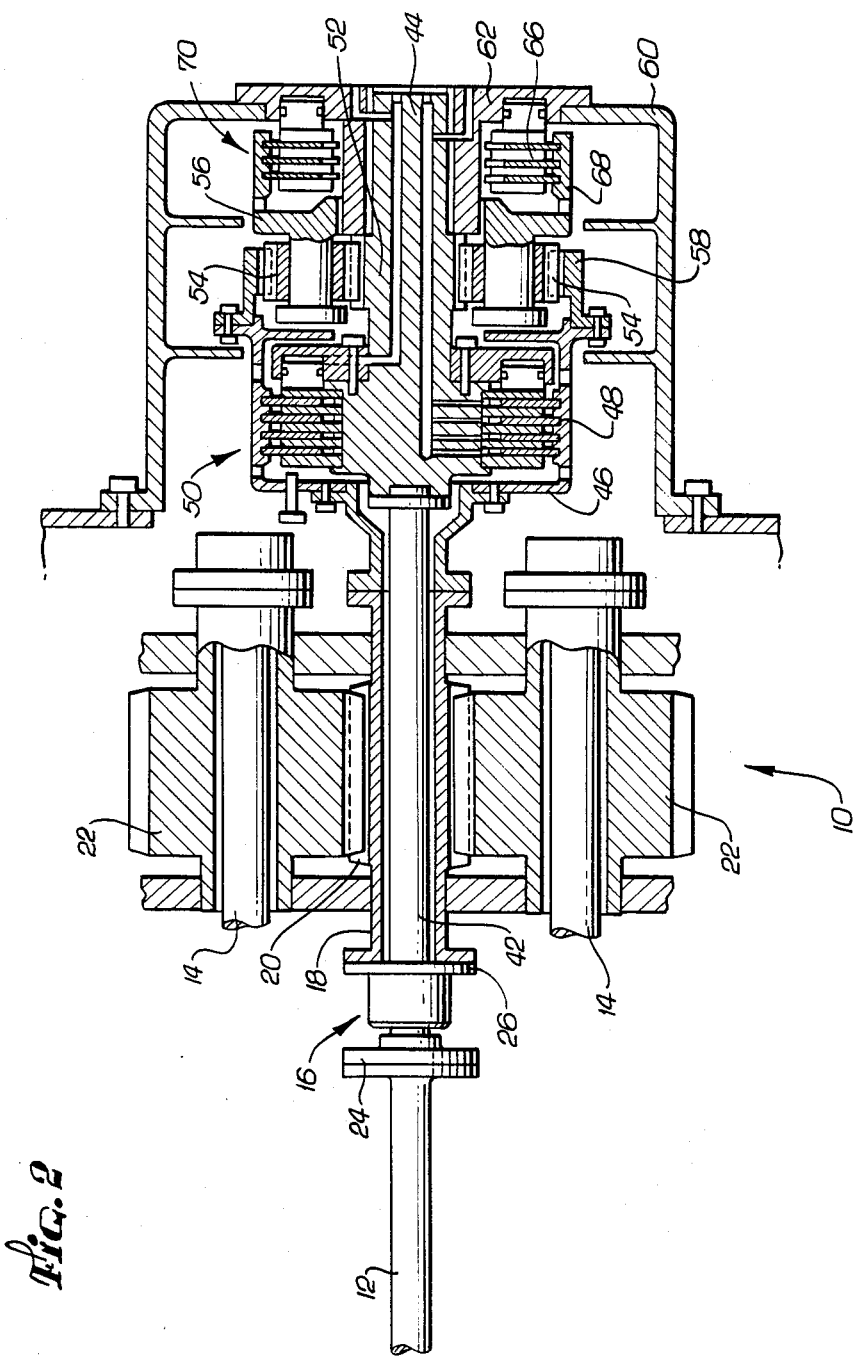
FIG. 2 is a cross-sectional view showing the transmission in greater detail.

A marine transmission 10 constructed in accordance with the present invention for use in a ship having a unidirectional power source is positioned between an input shaft 12 and a pair of output shafts 14, as shown schematically in FIG. 1. The input shaft 12 is coupled to a positive engagement clutch 16 by which it can be rigidly connected to an external shaft 18, the input shaft and the external shaft being in axial alignment.

When the positive engagement clutch 16 is engaged, the external shaft 18 is driven with the input shaft 12 in the same direction. A pinion 20 on the external shaft 18 engages a pair of output gears 22 to drive the output shafts 14. When operated in this manner, the transmission 10 is in the normal ahead mode. Frictional losses are minimized in this mode which is best suited for forward operation over relatively long periods of time and at relatively high speeds.

The preferred positive engagement clutch 16, shown separately in FIGS. 3–5, is of the synchro-self-shifting overrunning type in which two shafts are locked together at the instant that their speeds are equal. It has an input ring 24 which is bolted directly to the input shaft 12 and an output ring 26 at the opposite end that is bolted to the external shaft 18. The input ring 24 rotates with a central clutch shaft 28 that carries helical splines 30. A slider 32 encircles the clutch shaft 28 and engages the splines 30 in the manner of threads. At the end of the slider 32 nearest the input ring 24 is a first set of clutch teeth 34 and at the end nearest the output ring 26 is a set of ratchet teeth 36.

Let us assume that the external shaft 18 (the output of the clutch 16) is rotating faster than the input shaft 12. The clutch 16 is then in an overrunning condition. A clutch pawl 38 carried by the slider 32 is axially aligned with the ratchet teeth 36 as shown in FIG. 5, but passes over those teeth without engagement because of its direction of movement relative to the teeth.

To engage the clutch 16, the input shaft 12 is slowly accelerated. As it reaches the speed of the external shaft 18, the pawl 38 engages one of the ratchet teeth 36, as shown in FIGS. 3 and 4. With the pawl 38 in this position, the first set of clutch teeth 34 are aligned with a second set of clutch teeth 40 carried by the input ring 26. A very slight increase in the speed of the input shaft 12 then causes the slider 32, which cannot rotate faster because of the pawl 38, to move axially along the helical splines 30 until the teeth 34 and 40 come into full engagement and the slider 32 abuts against the input ring 24, as shown in FIG. 6. The external shaft 18 is thereafter driven through the clutch 16 with no frictional losses or slippage. The clutch 16 also includes a deactivation provision, not shown, by which the pawl 38 can be displaced axially to prevent engagement with the ratchet teeth 36, thereby preventing engagement of the clutch to transmit power regardless of the relative shaft speeds.

Clutches of this nature, manufactured, for example, by SSS, Ltd. of England, are familiar to those skilled in the art and are not, therefore, described here in greater detail. It will be understood that other types of positive engagement clutches may be used, but clutches of the type described are to be preferred.

Within the external shaft 18 is a concentric internal shaft 42, sometimes referred to as a quill shaft. It is directly connected to the clutch shaft 28 and the input ring 24. Hence it rotates with the input shaft 12 regardless of whether the positive engagement clutch 16 is engaged. On the opposite side of the pinion 20 from the positive engagement clutch 16, the internal shaft 42 is connected to an axially aligned but enlarged shaft extender 44 that rotates with the internal shaft.

The external shaft 18 carries a bell-like cylindrical enclosure member 46 that surrounds the inner end of the extender 44 closest to the pinion 20. A plurality of interleaved plates 48 extend radially from the extender 44 and from the bell 46, forming a conventional modulated engagement clutch 50. Preferably the modulated engagement clutch 50 operates hydroviscously, but it may also be a frictional clutch.

Upon engagement of the plates 48 sufficiently to transmit power flux, the bell-like member 46 is drivingly connected to the extender 44. Thus, the engagement of the modulated clutch 50 connects the external shaft 18 to the internal shaft 42, causing the external shaft to rotate with the input shaft in the same direction. Connection of the external shaft 18 to the input shaft 12 through the modulated clutch 50 and the internal shaft 42 constitutes the maneuver ahead mode of operation of the transmission 10.

Integrally formed with the extender 44, on the outside of the first modulated clutch 50, is a sun gear 52. In engagement with the sun gear 52 is an array of planet gears 54 mounted on a planet carrier 56. A ring gear 58, mounted on the end of the bell-like member 46 for rotation therewith also engages the planet gears 54.

As long as the planet carrier 56 is free to rotate, no force is transmitted from the extender 44 to the bell-like member 46 and hence the external shaft 18 is not driven through the gears 52, 54, and 58. If, however, the carrier 56 is, i.e., connected to ground, the external shaft 18 is forced to rotate, but in a direction opposite to that of the extender 44 and the internal shaft 42. Thus the sun gear 52, planet gears 54 and ring gear 58 form a planetary transmission.

The carrier 56 can be slowed or stopped by connecting it to a housing (ground) 60 that encloses the entire extender 44 and its surrounding components and supports the outer end of the extender in a bearing structure 62. The housing 60 is secured to the hull of the ship to absorb reaction forces from the transmission 10.

A series of interleaved plates 66 that are anchored alternately to the end of the housing 60 and to an annular flange 68 on the carrier 56 form a modulated engagement brake 70. Like the modulated clutch 50, it is preferable that the brake 70 operate hydroviscously, but it may operate frictionally. When the brake 70 is engaged the transmission 10 operates in the reverse mode.

The operation and use of the transmission 10 in its three mode will now be understood. When the ship is manuevering or getting underway, the manuever ahead mode is appropriate. The modulated engagement clutch 50 is employed to couple the external shaft 18 to the input shaft 12 through the internal shaft 42, thus causing rotation of the pinion 20 in the forward direction. Since the brake 70 is disengaged, the carrier 56 turns freely. Thus, in the manuever ahead mode the transmission 10 possesses the advantages of a conventional marine transmission, permitting low speed operation, gradual engagement, and power modulation.

In the reverse mode, the modulated engagement clutch 50 is disengaged and the brake 70 engaged. Power flux from the input shaft 12 is then carried by the internal shaft 42 and the extender 44 to the sun gear 52, through the planet gears 54 (which can rotate but cannot revolve because the carrier 56 is held against rotation) to the ring gear 58. Because the planet gears 54 are disposed between the sun gear 52 and the ring gear 58, the rotation of the external shaft 42 is against, i.e., opposite, the rotation of the input shaft 12. Modulated operation of the brake 70 can be used to control the speed of the planet carrier 56 and output shafts 14 in the reverse mode.

It should be noted that in the reverse mode the power is provided via the clutch shaft 28, but the output ring 26 is not driven because the pawl 38 is not axially aligned for engagement of the ratchet teeth 36. Thus, the external shaft 42 is not driven by the positive engagement clutch 16.

The third mode of operation of the transmission 10, its normal ahead mode, transmits the power flux through the output ring 26 of the positive engagement clutch 16 to the external shaft 18 without slippage. The clutch 50 and brake 70 are both disengaged and thus no power flux is transmitted through the internal shaft 42, although that shaft continues to rotate. In this mode, no hydroviscous or friction drives are involved. Efficiency is maximized and there is no risk of burning out the modulated engagement clutch 50 or the brake 70.

In some situations the forward motion of the ship will turn the propeller, rotating the output shafts 14 at a higher speed than that of the internal quill shaft 42. This, however, is permitted by the overrunning feature of the positive engagement clutch 16. At other times it is desirable to deactivate the positive engagement clutch 16 to prevent it from becoming engaged, as when the ship is decelerated through the speed of the power source. The clutch 16 can then be deactivated in the manner described above.

One important advantage of the transmission 10 is the redundancy of forward operation. If the positive engagement clutch 16 should fail, the ship can be driven ahead through the modulated engagement clutch 50. If the modulated engagement clutch 50 should fail, the positive engagement clutch 16 can be used for maneuvering. In the case of either of these two types of failures, forward operation does not require the use of "get home bolts", thus preserving the ability of the ship to operate in reverse.

While a particular form of the invention has been illustrated and described, it will be apparent that various modifications can be made without departing from the spirit and scope of the invention.

We claim:

1. A marine transmission capable of operating in normal ahead, manuever ahead and reverse modes, comprising:
    an input shaft;
    an output shaft;
    positive engagement clutch means for rigidly connecting said input shaft to said output shaft, thereby causing said transmission to operate in said normal ahead mode;
    first modulated engagement means for connecting said input shaft to said output shaft, thereby causing said transmission to operate in said manuever ahead mode;
    second modulated engagement means for operatively connecting said input shaft to said output shaft, thereby causing said transmission to operate in said reverse mode; and
    direction reversing means associated with one of said slip clutches for causing said shafts to rotate in opposite directions.

2. The transmission of claim 1 wherein said direction reversing means is a planetary gear arrangement.

3. The transmission of claim 1 wherein said positive engagement clutch is a synchro-self-shifting clutch.

4. A marine transmission capable of operating in normal ahead, manuever ahead and reverse modes, comprising:
    an input shaft;
    an external shaft;
    an internal shaft disposed within said external shaft;
    an output shaft coupled to said external shaft;
    positive engagement clutch means for rigidly connecting said external shaft to said input shaft to rotate said external shaft with said input shaft in the same direction and without slippage, thereby causing said transmission to operate in said normal ahead mode;
    first modulated engagement means for connecting said external shaft to said input shaft through said internal shaft to rotate said external shaft with said input shaft in the same direction, thereby causing said transmission to operate in said maneuver ahead mode;
    gear means arranged between said external and internal shafts for causing rotation of said external and internal shafts in opposite directions; and
    second modulated engagement means for connecting said external shaft to said input shaft through said internal shaft and said gears means to rotate said external against said input shaft, thereby causing said transmission to operate in said reverse mode.

5. The transmission of claim 4 wherein said positive engagement clutch means and said first engagement means are at opposite ends of said internal shaft.

6. The transmission of claim 4 wherein said positive engagement clutch means is at one end of said internal shaft, and said first and second modulated engagement means and said gear means are at the opposite end of said internal shaft.

7. The transmission of claim 4 wherein said positive engagement clutch means includes overrun means for permitting said external shaft to turn faster than said input shaft.

8. The transmission of claim 4 wherein said gear means comprises a sun gear, a set of planet gears and a ring gear.

9. The transmission of claim 8 wherein said sun gear is connected to said internal shaft for rotation therewith.

10. The transmission of claim 9 wherein said ring gear is connected to said external shaft for rotation therewith.

11. The transmission of claim 4 wherein said gear means comprises:
    a sun gear connected to said internal shaft for rotation therewith;
    a planet carrier;
    a plurality of planet gears mounted on said carrier and in engagement with said sun gear; and
    a ring gear connected to said external shaft for rotation therewith, encircling said planet gears and in engagement with said planet gears.

12. The transmission of claim 11 further comprising a non-rotatable housing, said second modulated engagement means being arranged between said carrier and said housing to prevent rotation of said carrier relative to said housing when engaged.

13. The transmission of claim 4 wherein said positive engagement clutch is of the synchro-self-shifting type.

14. The transmission of claim 4 wherein said positive engagement clutch includes input and output members, clutch teeth for connecting said input and output members, ratchet teeth, and a pawl engageable with said ratchet teeth to synchronize said clutch teeth.

15. A marine transmission capable of operating in a normal ahead, maneuver ahead and reverse modes, comprising:
    an input shaft;
    an external shaft;
    an internal shaft disposed within said external shaft;
    an output shaft coupled to said external shaft;

positive engagement clutch means for rigidly connecting said external shaft to said input shaft to rotate said external shaft with said input shaft in the same direction and without slippage, thereby causing said transmission to operate in said normal ahead mode;

an extender secured to said internal shaft for rotation therewith;

a bell-like member surrounding said extender and secured to said external shaft for rotation therewith;

modulated engagement clutch means including a plurality of interleaved plates secured to said extender and said bell-like member for frictionally connecting said external shaft to said input shaft through said internal shaft to rotate said external shaft with said input shaft in the same direction, thereby causing said transmission to operate in said maneuver ahead mode;

planetary gear means arranged between said external and internal shafts for causing rotation of said external and internal shafts in opposite directions; and modulated engagement brake means for connecting said external shaft to said input shaft through said internal shaft and said gear means to rotate said external shaft against said input shaft, thereby causing said transmission to operate in said reverse mode.

16. The transmission of claim 15 further comprising a non-rotatable housing, said planetary gear means comprising:
   a sun gear connected to said internal shaft for rotation therewith;
   a plurality of planet gears engaging said sun gear;
   a planet carrier on which said planet gears are mounted; and
   a ring gear engaging said planet gears and secured to said bell-like member for rotation therewith.

17. The transmission of claim 16 wherein said brake means includes a plurality of interleaved plates connected to said planet carrier and said housing.

18. The transmission of claim 15 wherein said positive engagement clutch means and said modulated engagement clutch means are on opposite ends of said internal shaft.

19. The transmission of claim 15 wherein said positive engagement clutch is of the synchro-self-shifting type.

20. The transmission of claim 15 wherein said positive engagement clutch includes input and output members, clutch teeth connecting said input and output members, ratchet teeth, and a pawl engageable with said ratchet teeth to synchronize said clutch teeth.

* * * * *